(12) United States Patent
Debban et al.

(10) Patent No.: US 11,280,977 B2
(45) Date of Patent: Mar. 22, 2022

(54) ROLLABLE RIBBON FIBERS WITH WATER-SWELLABLE COATINGS

(71) Applicant: OFS Fitel, LLC, Norcross, GA (US)

(72) Inventors: Harold P. Debban, Snellville, GA (US); Peter A. Weimann, Atlanta, GA (US); Heng Ly, Stone Mountain, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 17/032,859

(22) Filed: Sep. 25, 2020

(65) Prior Publication Data

US 2021/0018706 A1 Jan. 21, 2021

Related U.S. Application Data

(62) Division of application No. 15/936,852, filed on Mar. 27, 2018, now Pat. No. 10,871,621.

(51) Int. Cl.
*G02B 6/44* (2006.01)

(52) U.S. Cl.
CPC .......... *G02B 6/448* (2013.01); *G02B 6/4403* (2013.01); *G02B 6/4494* (2013.01)

(58) Field of Classification Search
None
See application file for complete search history.

(56) References Cited

U.S. PATENT DOCUMENTS

| | | | | |
|---|---|---|---|---|
| 5,720,908 A | * | 2/1998 | Gaillard | G02B 6/4403 |
| | | | | 174/117 F |
| 5,856,410 A | * | 1/1999 | Carrico | C08F 8/44 |
| | | | | 525/362 |
| 6,377,738 B1 | * | 4/2002 | Anderson | G02B 6/4433 |
| | | | | 385/100 |
| 6,677,394 B1 | * | 1/2004 | Butterbach | G02B 6/4494 |
| | | | | 524/379 |
| 9,841,573 B1 | * | 12/2017 | Debban | G02B 6/4434 |
| 10,101,549 B2 | * | 10/2018 | Hoshino | G02B 6/4403 |
| 10,107,980 B1 | * | 10/2018 | Debban | G02B 6/4434 |
| 10,310,202 B2 | * | 6/2019 | Blazer | G02B 6/4404 |
| 10,871,621 B2 | * | 12/2020 | Debban | G02B 6/448 |
| 2003/0103741 A1 | * | 6/2003 | Heinl | G02B 6/4494 |
| | | | | 385/102 |
| 2004/0038608 A1 | * | 2/2004 | Shaw | C09K 3/32 |
| | | | | 442/118 |

(Continued)

*Primary Examiner* — Jerry Rahll
(74) *Attorney, Agent, or Firm* — Sam S. Han, Esq.

(57) ABSTRACT

A fiber-optic cable having optical fibers that are arranged as a rollable ribbon. Water-swellable material (e.g., superabsorbent liquid, superabsorbent powder, superabsorbent adhesive, etc.) is applied directly to the rollable ribbon, thereby eliminating the need to incorporate conventional water-absorbing yarns, tapes, or other such similar materials. The rollable ribbon is surrounded by a tube, with a dielectric strength member positioned external to the tube and substantially parallel to the tube. A jacket, with a ripcord along a substantial length of the jacket, surrounds the tube. Also taught is a process for manufacturing a rollable-ribbon fiber-optic cable, in which a water-swellable material is applied directly to the rollable ribbon, thereby eliminating the need to incorporate conventional water-absorbing yarns, tapes, or other such similar materials.

13 Claims, 5 Drawing Sheets

(56) References Cited

U.S. PATENT DOCUMENTS

| | | | | |
|---|---|---|---|---|
| 2004/0065457 | A1* | 4/2004 | Hager | G02B 6/4432 |
| | | | | 174/36 |
| 2004/0208462 | A1* | 10/2004 | Parsons | G02B 6/4494 |
| | | | | 385/100 |
| 2006/0089617 | A1* | 4/2006 | Bunnelle | A61F 13/58 |
| | | | | 604/389 |
| 2009/0279835 | A1* | 11/2009 | de Montmorillon | |
| | | | | G02B 6/0365 |
| | | | | 385/127 |
| 2010/0080521 | A1* | 4/2010 | Bardroff | G02B 6/4494 |
| | | | | 385/102 |
| 2011/0135816 | A1* | 6/2011 | Burns | G02B 6/4494 |
| | | | | 427/163.2 |
| 2014/0016905 | A1* | 1/2014 | Tanabe | G02B 6/4403 |
| | | | | 385/114 |
| 2017/0139168 | A1* | 5/2017 | Kaji | G02B 6/4413 |
| 2017/0235068 | A1* | 8/2017 | Debban | G02B 6/4433 |
| | | | | 385/110 |
| 2017/0299829 | A1* | 10/2017 | Hoshino | G02B 6/4411 |
| 2018/0031792 | A1* | 2/2018 | Risch | G02B 6/4404 |
| 2018/0136423 | A1* | 5/2018 | Takeda | G02B 6/4403 |
| 2018/0224619 | A1* | 8/2018 | Debban | G02B 6/4434 |
| 2019/0049681 | A1* | 2/2019 | Bookbinder | G02B 6/4413 |
| 2019/0219783 | A1* | 7/2019 | Ly | G02B 6/3873 |

* cited by examiner

Rollable Ribbon Cable Cross-Section

ROLLABLE RIBBON FIBERS WITH WATER-SWELLABLE COATINGS

CROSS-REFERENCE TO RELATED APPLICATIONS

This application is a divisional application of prior application Ser. No. 15/936,852, filed on 2018 Mar. 27, by Debban, and having the title "Rollable Ribbon Fibers with Water-Swellable Coatings," which is incorporated herein by reference as if expressly set forth in its entirety.

BACKGROUND

Field of the Disclosure

The present disclosure relates generally to fiber-optic cables and, more particularly, to fiber-optic cables with rollable ribbon fibers.

Description of Related Art

Fiber-optic cables can be manufactured with different arrangements of optical fibers (e.g., fiber bundles, flat ribbon stacks, rollable ribbons, etc.) and those having skill in the art appreciate the remarkable differences in the cabling processes for these different types of fiber-optic cables. In addition to the internal differences, external influences also affect the design of fiber-optic cables. For example, because of the environment in which outside plant (OSP) cables are installed, there are industry standards for water penetration that the OSP cables are typically required to meet. Limiting water penetration can simplify access to optical fibers throughout the cable lifetime, prevent damage to system electronics, and protect the glass against the effects of liquid water. Because of these myriad factors that need to be considered in manufacturing fiber-optic cables, the manufacturing processes for cables are often complex, expensive, and quite difficult.

SUMMARY

The present disclosure teaches a fiber-optic cable having optical fibers that are arranged as a rollable ribbon. Water-swellable material (e.g., superabsorbent liquid, superabsorbent powder, superabsorbent hot-melt, etc.) is applied directly to the rollable ribbon, thereby eliminating the need to incorporate conventional water-blocking yarns, tapes, or other such similar materials (collectively defined herein as "water-blocking yarns"). In one embodiment, one or more rollable ribbons are surrounded by a tube, with at least one dielectric or metallic strength member positioned external to the tube and substantially parallel to the tube. A jacket, with a ripcord along a substantial length of the jacket, surrounds the tube. In another embodiment, a cable is assembled out of multiple tubes containing one or more rollable ribbons coated with water-swellable material.

In addition to the fiber-optic cable itself, the present disclosure teaches a process of manufacturing a rollable-ribbon fiber-optic cable in which a water-swellable material is applied directly to the rollable ribbon, thereby eliminating the need to incorporate conventional water-absorbing yarns, tapes, or other such similar materials (hereafter collectively defined herein as "water-absorbing yarn").

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
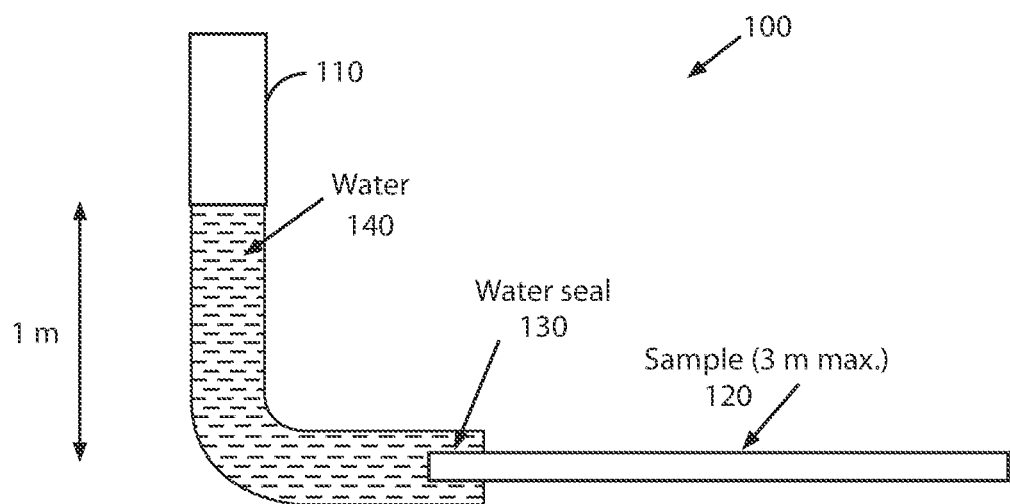
FIG. 1 is a diagram showing an example configuration for testing water penetration in fiber-optic cables.

Environmental factors for outside plant (OSP) cables are addressed in various industry standards for water penetration. For example, both Insulated Cable Engineers Association, Inc. ("ICEA") standards (e.g., ICEA-S-87-640, which is the American National Standard for Outside Plant Cable) and Telcordia GR-20 (collectively designated herein as "Standards") require that OSP cables block a one meter (1 m) pressure head of water within a three meter (3 m) length of OSP cable when that water is applied to one end of the OSP cable for at least twenty-four (24) hours. One example setup of such a measurement is shown in FIG. 1, which includes a 3 m OSP cable 120 coupled to a penetration testing apparatus 110 that has a 1 m pressure head of water 140. The OSP cable 130 is coupled to the apparatus 110 in such a way that there exists a water seal 130 between the OSP cable 120 and the apparatus 110. Similar water penetration tests are required by other international standards.

Figure 2:
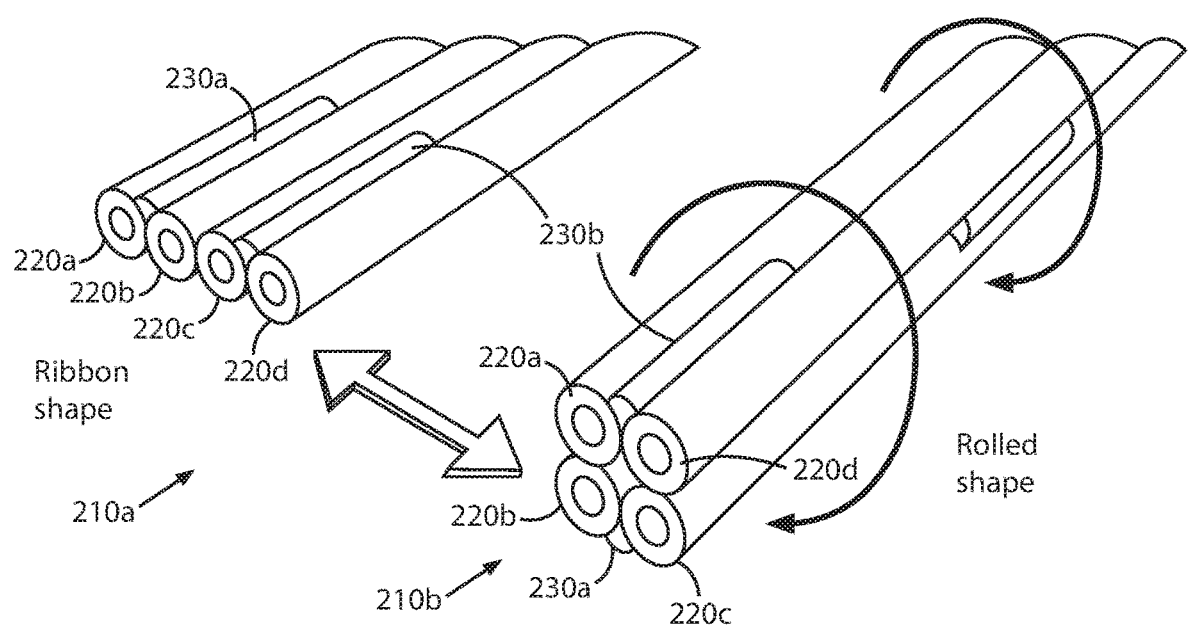
FIG. 2 is a diagram showing one embodiment of a rollable ribbon with partial bonding between optical fibers.

Cables containing rollable ribbons (also referred to as partially bonded ribbons) allow manufacture of cables with higher fiber packing density than cables incorporating traditional flat ribbons while still allowing for high-productivity mass fusion splicing of the ribbons during cable installation. As shown in FIG. 2, partial bonds 230a, 230b (collectively designated herein as 230) between optical fibers 220a . . . 220d (collectively designated herein as 220) in the rollable ribbon 210a, 210b (collectively designated herein as 210) allow the rollable ribbon 210 to be rolled into a roughly cylindrical shape inside of a cable (not shown in FIG. 2). This allows the rollable ribbon 210 to completely fill the space inside a round cable subunit tube. In contrast, a rectangular stack of flat ribbons leaves empty spaces within the subunit tube.

Figure 3:
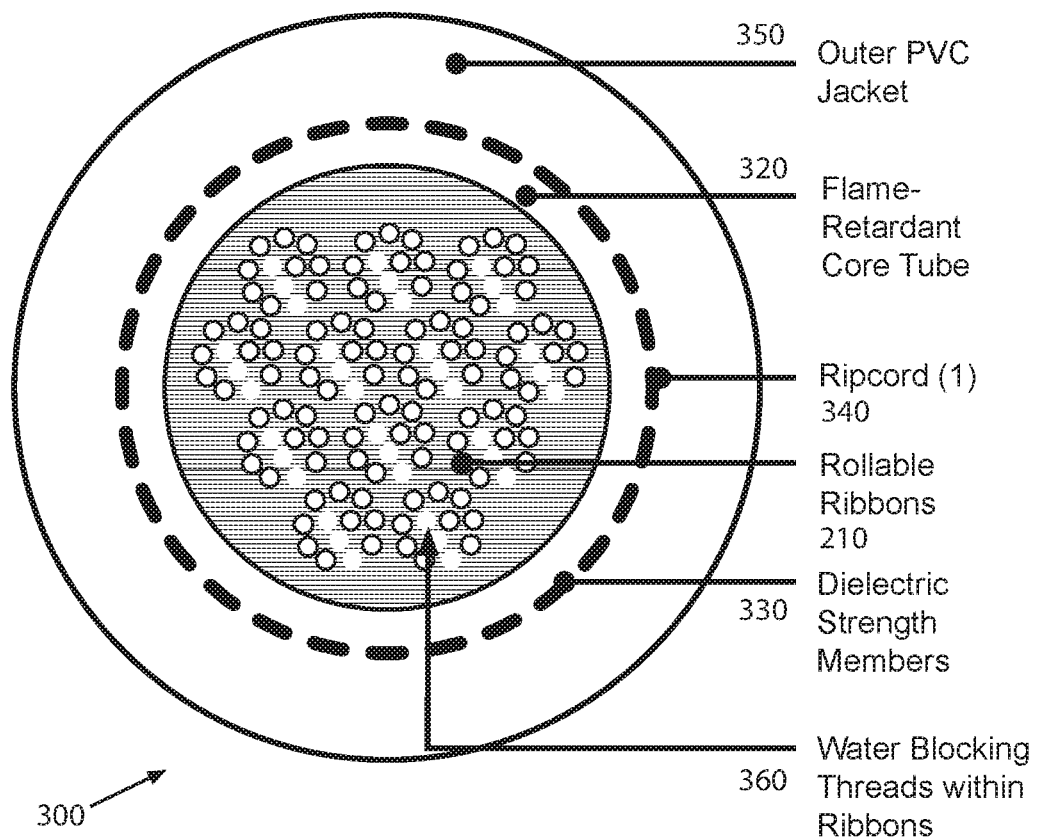
FIG. 3 is a diagram showing a cross-sectional view of one embodiment of a rollable-ribbon cable.

However, one disadvantage of the rollable ribbon structure 210 is that the areas within the ribbon where the fibers 220 are not bonded 230 create a multiplicity of paths in which water penetration can occur. Therefore, in order for rollable ribbon cables to meet stringent Standards for rollable ribbon cables, numerous water-blocking yarns, tapes, or other similar elements (collectively defined herein as "water-blocking yarns") must be disposed among the rollable ribbons 210, specifically in the water-penetration pathways. One example of this is shown in FIG. 3, which shows a cross-sectional view of a rollable-ribbon cable 300 having conventional water-blocking yarns 360 disposed among the rollable ribbons 210, all situated within a tube 320. As shown in FIG. 3, the rollable-ribbon cable also includes dielectric strength members 330 that run alongside and external to the tube 320, all of which are surrounded by a jacket 350 with a ripcord 340 (for use in stripping the cable). To be clear, because of the large number of interstitial spaces that exist in partially-bonded rollable ribbons 210, a correspondingly large number of water-blocking yarns 360 must be used to safeguard against water penetration.

Figure 4:
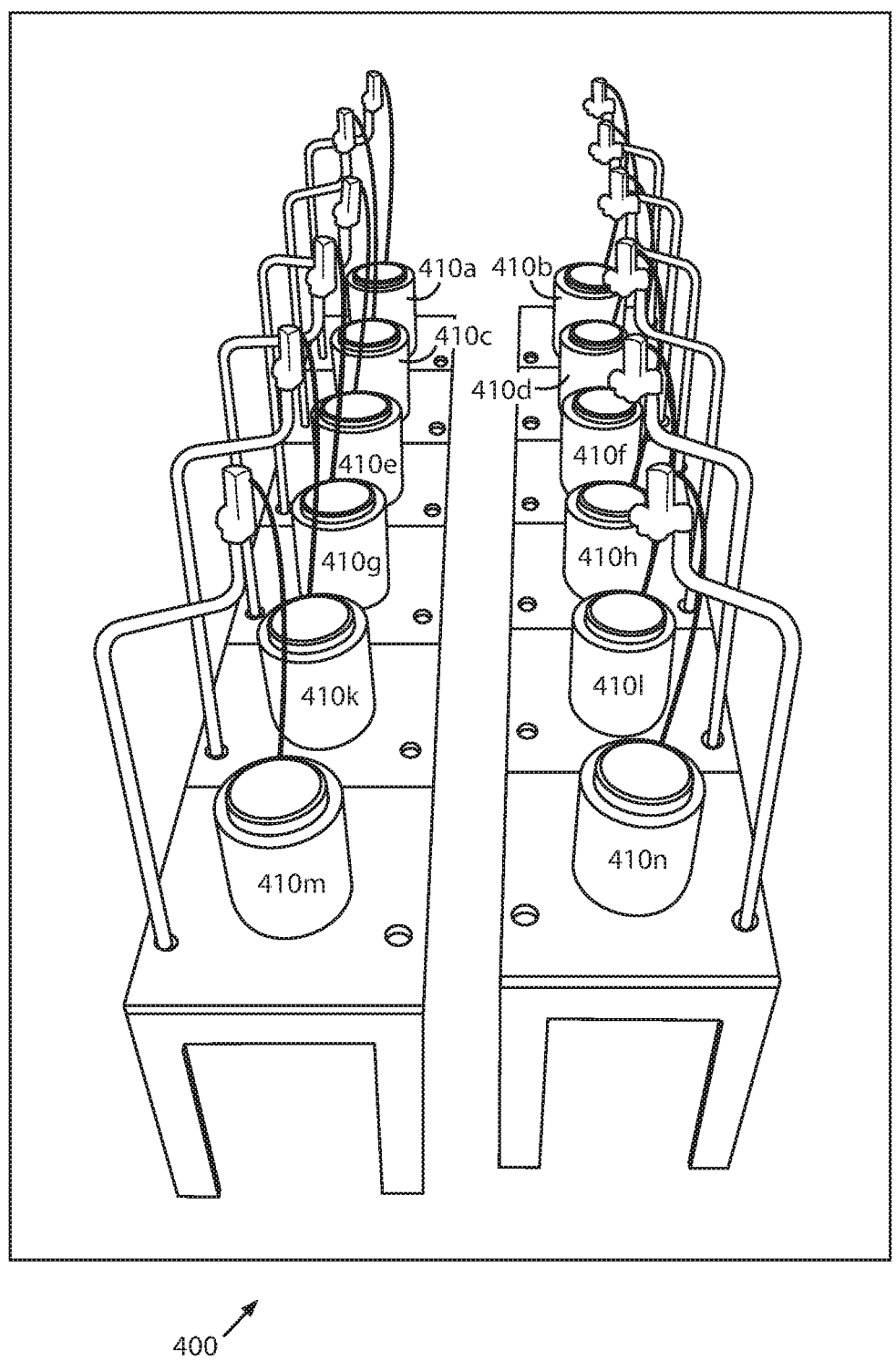
FIG. 4 is a diagram showing a manufacturing setup for a conventional cabling process.

Because of the need for multiple water-blocking yarns 360, the cabling setup for the OSP cable 300 requires a complex payoff configuration for those water-blocking yarns 360. One such example is shown in FIG. 4, which shows a manufacturing setup 400 with twelve (12) payoff spools 410a . . . 410n (collectively designated herein as 410). This complex payoff configuration 400 (which is not necessarily employed for flat-ribbon stacks or fiber bundles) adds complexity to the manufacturing process for rollable-ribbon cables. This complexity correspondingly increases the cost and difficulty of stringing up and launching the tubes used within rollable-ribbon cables.

Conventional wisdom teaches that applying pressure directly to optical fibers will contribute to micro-bending losses. Despite conventional wisdom, the present disclosure teaches the application of water-swellable material (e.g., superabsorbent liquid, superabsorbent powder, etc.) directly to rollable ribbons. Microbending losses can be minimized through selection of highly uniform water-swellable materials, (e.g., uniform liquid coatings, powders with very small particle sizes, dispersions of fine powder within a hot melt carrier, etc.). Although the water-swellable materials will exert some amount of pressure to the rollable ribbons when the water-swellable materials absorb water, the elimination of conventional water-blocking yarns reduces the complexity associated with manufacturing rollable ribbon OSP cables.

Having provided a general solution of applying a water-swellable material directly to rollable ribbons, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 5:
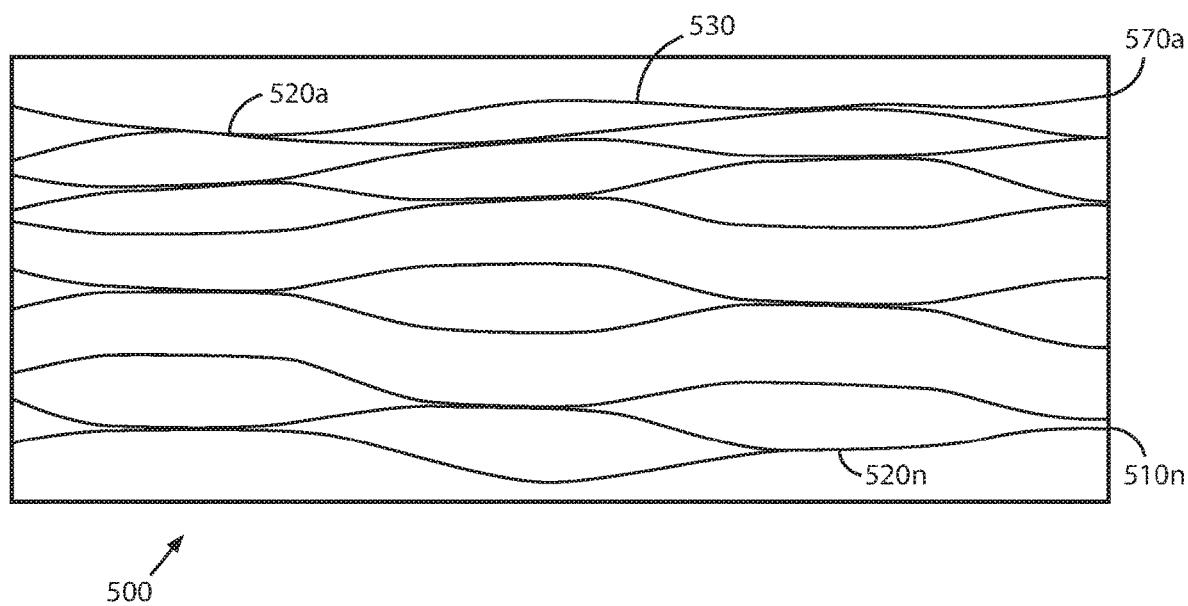
FIG. 5 is a diagram showing one embodiment of optical fibers arranged as a rollable ribbon, with a water-swellable coating on one or more fibers of the rollable ribbon.

FIG. 5 is a diagram showing one embodiment of optical fibers arranged as a rollable ribbon, with a water-swellable coating on one or more fibers of the rollable ribbon. As shown in FIG. 5, optical fibers 510a . . . 510n (collectively designated as 510) are arranged as a rollable ribbon 500 with partial bonds 520a . . . 520n (collectively designated herein as 520 or "matrix 520") between the optical fibers 510, thereby creating large numbers of interstitial spaces in the rollable ribbon 500. Stated differently, the partial bonds 520a . . . 520n create a matrix 520 and the optical fibers 510 are partially bonded with the matrix 520 to form the rollable ribbon 500. Insofar as processes for ribbonizing optical fibers using ribbon-manufacturing processes are known in the art, only a truncated discussion of ribbon-manufacturing processes is provided herein. Suffice it to say that those having skill in the art understand that rollable ribbon fibers (also designated simply as rollable ribbons) are produced using these conventional ribbon-manufacturing processes. However, unlike conventional rollable ribbons, the embodiment of rollable ribbon 500 in FIG. 5 comprises a water-swellable material 530 that is applied directly to the rollable ribbon 500 to safeguard against water penetration.

In some embodiments, the water-swellable material 530 comprises a superabsorbent liquid, such as a water-based acrylic polymer that is similar to the WKR-12 system sold by Stewart Superabsorbents, Inc., of Hickory, N.C. In some embodiments, the superabsorbent liquid is applied directly to one or more fibers in the rollable ribbon 500 by dipping the rollable ribbon 500 in the superabsorbent liquid after the rollable ribbon 500 is manufactured. In other embodiments, the water-swellable material 530 is applied directly to the rollable ribbon fibers 500 in-line with the ribbon-manufacturing process (and as an integral part of the ribbon-manufacturing process). In yet other embodiments, the water-swellable material 530 is applied off-line during rewinding of the rollable ribbon fibers 500 onto a spool and prior to cabling the rollable ribbon fibers 500. In yet other embodiments, the water-swellable material 530 is applied to one or more rollable ribbons during the manufacture of a cable subunit tube. Those having skill in the art will appreciate that the water-swellable material 530 is also applicable directly to the rollable ribbon fibers 500 at different points during the cabling process. Other methods may be suitable for application of the water-swellable material 530, such as spraying through a nozzle or applying using a fluidized-bed applicator.

In other embodiments, the water-swellable material 530 comprises a superabsorbent powder, such as a sodium polyacrylate, a potassium acrylate, a potassium acrylamide, or any combination thereof. For embodiments that employ superabsorbent powders, the superabsorbent powder (e.g., sodium polyacrylate, potassium acrylate, potassium acrylamide, etc.) may be first suspended in a water-based solution (or other liquid-based solution). Thereafter, the water-based solution (with the suspended powder) is applied directly to one or more of the rollable ribbon fibers 500. In other embodiments, the superabsorbent powder (e.g., sodium polyacrylate, potassium acrylate, potassium acrylamide, etc.) may be compounded into a hot-melt material and applied directly to one or more of the rollable ribbon fibers 500.

After the water-swellable material 530 is applied directly to rollable ribbon fibers 500, the rollable ribbon fibers 500 are cabled. Unlike conventional rollable-ribbon cables, the cable having the rollable ribbon 500 (with the water-swellable material 530 directly applied) is manufactured without incorporating a water-blocking yarn, thereby removing the need for complex pay-off configurations (such as that shown in FIG. 4) and, thus, simplifying the manufacture of rollable ribbon OSP cables that meet industry Standards.

Figure 6:
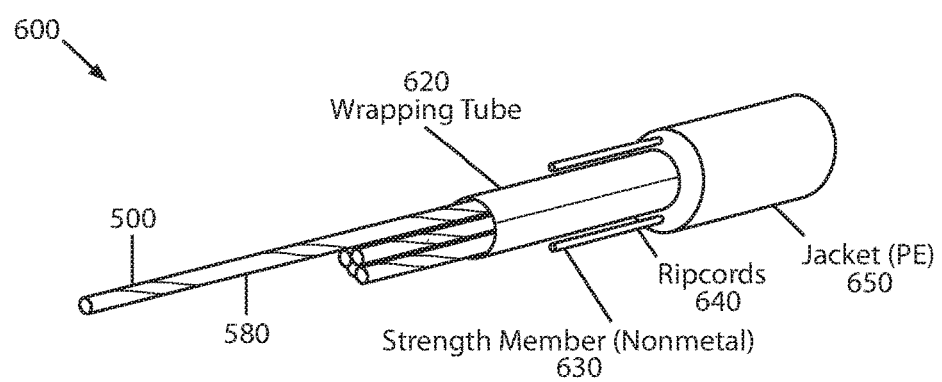
FIG. 6 is a diagram showing a perspective view of one embodiment of a rollable-ribbon cable with the water-swellable coating applied directly to a rollable ribbon.

The conclusion of the cabling process results in an OSP cable, such as the rollable-ribbon cable 600 shown in FIG. 6, which complies with industry Standards for OSP cables. As shown in the embodiment of FIG. 6, the rollable-ribbon OSP cable 600 comprises multiple rollable ribbons 500 with water-swellable material 530 applied directly to the rollable ribbon 500. It should be appreciated that not all rollable ribbons 500 need to be coated with water-swellable material 530 to meet industry Standards. For example, coating one (1) out of every six (6) rollable ribbons 500 may be sufficient to meet industry standards. Those having skill in the art can readily determine the minimum number of ribbons that need to be coated and, thus, only a truncated discussion of such cables is provided herein.

Continuing with FIG. 6, the OSP cable 600 further comprises a tube 620 (typically fabricated from an extruded thermoplastic, such as poly(butylene terephthalate) or polypropylene) that surrounds the rollable ribbons 500, dielectric strength members 630 that are positioned external to the tube 620 and aligned substantially parallel to the tube 620, and a jacket 650 (typically fabricated from polyethylene or another weather-resistant thermoplastic) that surrounds the tube 620. The OSP cable 600 also comprises a ripcord 640 that is located along a substantial length of the jacket 650, which facilitates stripping of the jacket 650.

As shown in the embodiments of FIGS. 5 and 6 (and their corresponding descriptions), the present disclosure provides for the application of water-swellable material (e.g., superabsorbent liquid, superabsorbent powder, etc.) directly to rollable ribbons. Thus, while the water-swellable materials will exert some amount of pressure to the rollable ribbons when the water-swellable materials absorb water, the elimination of conventional water-blocking yarns reduces the complexity associated with manufacturing rollable ribbon OSP cables that meet industry Standards.

Flame-retardant "outdoor-indoor" OSP optical cables allow cable users to install part of the cable within buildings, thus allowing the installer to avoid a costly and time-consuming splice between a non-flame-retardant OSP cable and a flame-retardant Premises cable at the building entrance. In this case, both the tube 620 and the jacket 650 may advantageously be fabricated out of flame-retardant materials such as low-smoke zero-halogen thermoplastic compounds or polyvinyl chloride (PVC).

Also, while not shown in the drawings, one having skill in the art will appreciate that the direct application of water-swellable material can also be implemented in loose-tube cables with rollable ribbon fibers, metallic central core cables having rollable ribbon fibers that are strength-reinforced with corrugated steel armor, or any other type of rollable ribbon fibers. In other words, any type of rollable ribbon fibers can benefit from the direct application of water-swellable materials.

Any process descriptions should be understood as steps in the process and alternative implementations are intended to be included within the scope of the preferred embodiment of the present disclosure in which functions may be executed out of order from that shown or discussed, including substantially concurrently or in reverse order, depending on the functionality involved, as would be understood by those reasonably skilled in the art. Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A process comprising:
   applying a water-swellable material directly to rollable ribbon fibers;
   cabling the rollable ribbon fibers without incorporating a water-blocking yarn; and
   rewinding the rollable ribbon fibers onto a spool prior to cabling the rollable ribbon fibers.

2. The process of claim 1, further comprising:
   ribbonizing optical fibers using a ribbon-manufacturing process to produce the rollable ribbon fibers.

3. The process of claim 2, wherein the step of applying the water-swellable material directly to the rollable ribbon fibers comprises:
   applying the water-swellable material directly to the rollable ribbon fibers as part of the ribbon-manufacturing process.

4. The process of claim 1, wherein the step of applying the water-swellable material directly to the rollable ribbon fibers comprises:
   applying the water-swellable material directly to the rollable ribbon fibers during the rewinding of the rollable ribbon fibers onto the spool.

5. The process of claim 1, wherein the step of applying the water-swellable material directly to the rollable ribbon fibers comprises:
   applying the water-swellable material directly to the rollable ribbon fibers during the cabling of the rollable ribbon fibers.

6. The process of claim 1, wherein the step of applying the water-swellable material directly to the rollable ribbon fibers comprises:
   applying a superabsorbent liquid directly to the rollable ribbon fibers.

7. The process of claim 1, wherein the step of applying the water-swellable material directly to the rollable ribbon fibers comprises:
   applying a superabsorbent water-based acrylic polymer directly to the rollable ribbon fibers.

8. The process of claim 1, wherein the step of applying the water-swellable material directly to the rollable ribbon fibers comprises:
   dipping the rollable ribbon fibers in a superabsorbent liquid.

9. The process of claim 1, wherein the step of applying the water-swellable material directly to the rollable ribbon fibers comprises:
   applying a superabsorbent powder directly to the rollable ribbon fibers.

10. The process of claim 9, wherein the step of applying the superabsorbent powder directly to the rollable ribbon fibers comprises:
    suspending the superabsorbent powder in a water-based solution; and
    applying the water-based solution with the suspended superabsorbent powder to the rollable ribbon fibers.

11. The process of claim 10, wherein the step suspending the superabsorbent powder in the water-based solution is one selected from the group consisting of:
    suspending a sodium polyacrylate in the water-based solution;
    suspending a potassium acrylate in the water-based solution;
    suspending a potassium acrylamide in the water-based solution; and
    suspending a combination of sodium polyacrylate, potassium acrylate, and potassium acrylamide in the water-based solution.

12. The process of claim 1, wherein the step of applying the water-swellable material directly to the rollable ribbon fibers comprises:
    mixing a superabsorbent powder into a hot melt material; and
    applying the hot melt material to the rollable ribbon fibers.

13. The process of claim 12, wherein the hot-melt material comprises a superabsorbent power selected from the group consisting of:
  sodium polyacrylate;
  potassium acrylate;
  potassium acrylamide; and
  a combination of sodium polyacrylate, potassium acrylate, and potassium acrylamide.

\* \* \* \* \*